US009883097B2

United States Patent
Cardei et al.

(10) Patent No.: US 9,883,097 B2
(45) Date of Patent: Jan. 30, 2018

(54) OPTICAL FLOW BASED AUTO FOCUS

(71) Applicant: Google Inc., Mountain View, CA (US)

(72) Inventors: Vlad C. Cardei, Redwood City, CA (US); Andrey Yatsunenko, Los Gatos, CA (US); Edward Chang, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/173,306

(22) Filed: Jun. 3, 2016

(65) Prior Publication Data

US 2017/0353653 A1    Dec. 7, 2017

(51) Int. Cl.
*H04N 5/232*    (2006.01)
*H04N 5/14*    (2006.01)
*G03B 13/36*    (2006.01)

(52) U.S. Cl.
CPC ......... *H04N 5/23212* (2013.01); *G03B 13/36* (2013.01); *H04N 5/144* (2013.01)

(58) Field of Classification Search
None
See application file for complete search history.

(56) References Cited

U.S. PATENT DOCUMENTS

| 8,670,483 B2 | 3/2014 | Morphet et al. |
| 8,929,451 B2 | 6/2015 | Fishwick et al. |
| 2009/0136223 A1* | 5/2009 | Motomura ............... G02B 3/10 396/77 |
| 2012/0200725 A1 | 8/2012 | Albu et al. |
| 2014/0253785 A1* | 9/2014 | Chan ...................... H04N 5/144 348/349 |

FOREIGN PATENT DOCUMENTS

WO    2006120146 A2    11/2006

* cited by examiner

*Primary Examiner* — James Hannett
(74) *Attorney, Agent, or Firm* — Fish & Richardson P.C.

(57) ABSTRACT

A method is described that includes identifying a set of features of an object, the features being tracked in an image captured by a camera. The method also includes creating a field of vectors for the reference points. The vectors indicate magnitude and direction of change in position of the reference points across more than one frame of the image. The method further includes identifying existence of out of plane movement of the object's features from same radial orientation of the vectors. The method further includes determining an amount of closer/farther movement of the object's features to/from the camera from change in distances between a plurality of the reference points. The method further includes adjusting a position of camera's lens in view of the amount of closer/farther movement of the object's features to keep the camera focused on the object.

20 Claims, 18 Drawing Sheets

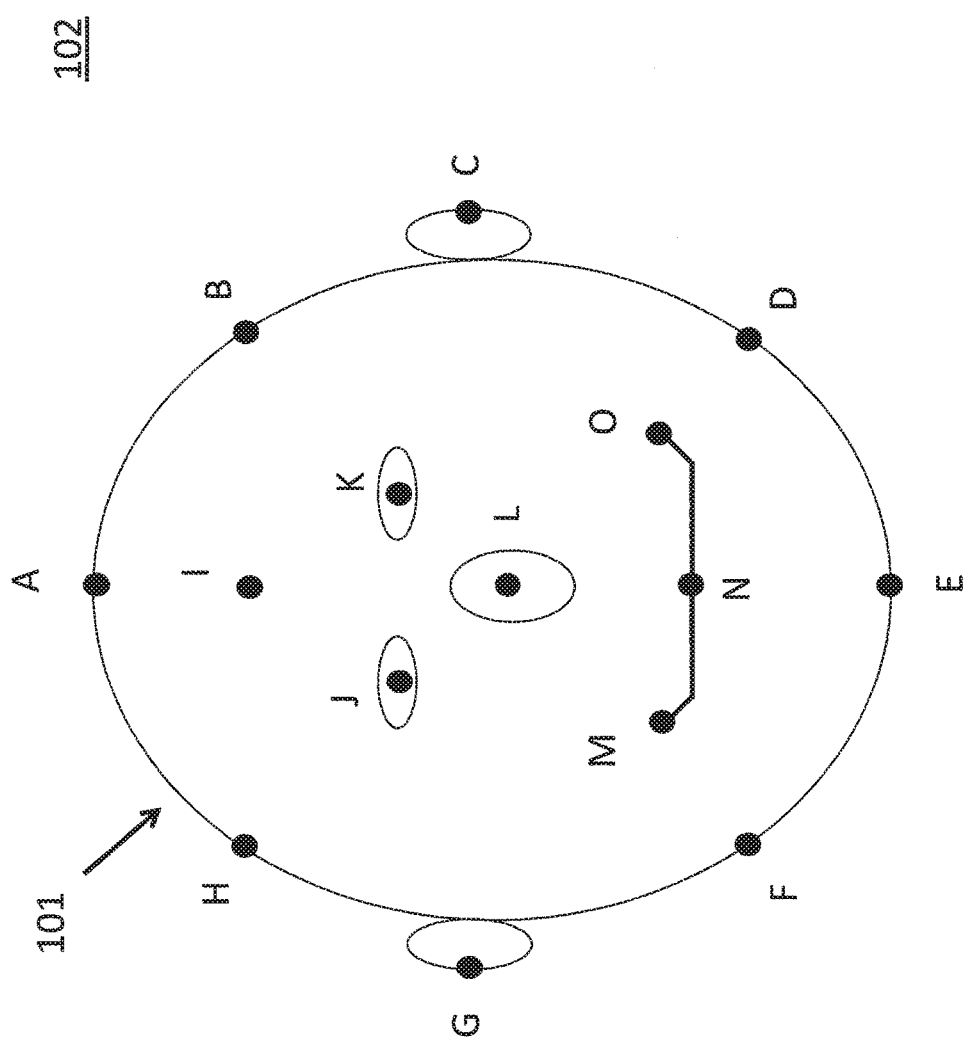

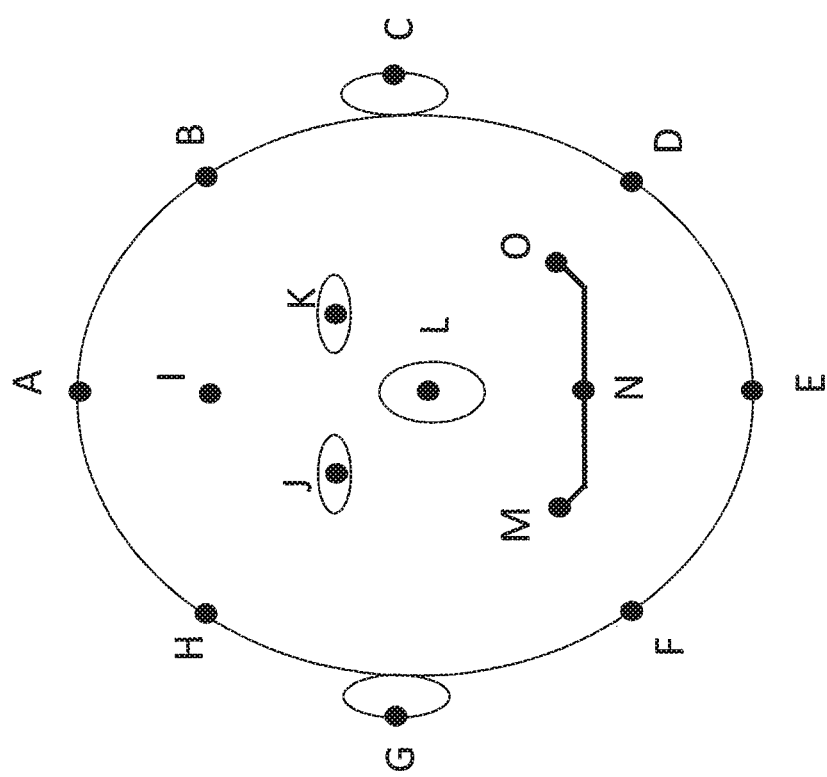

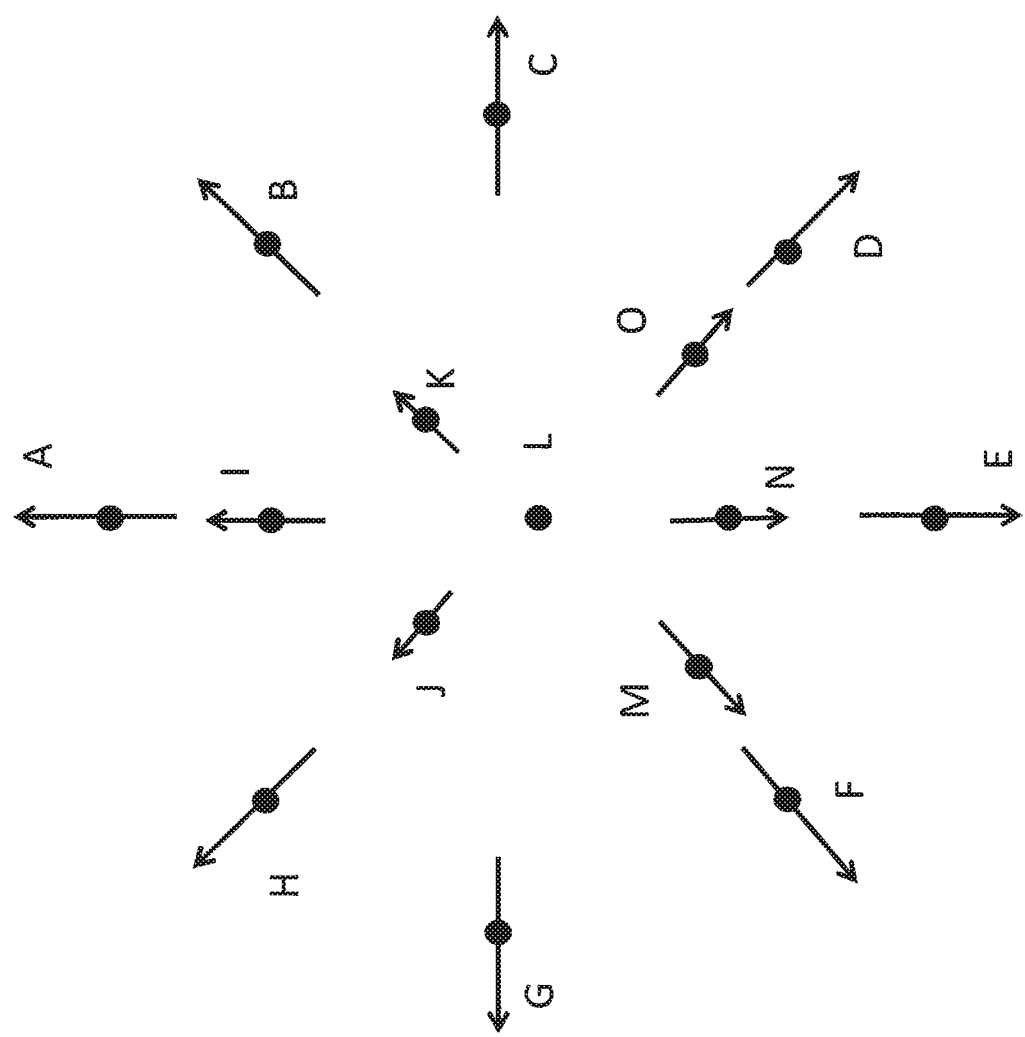

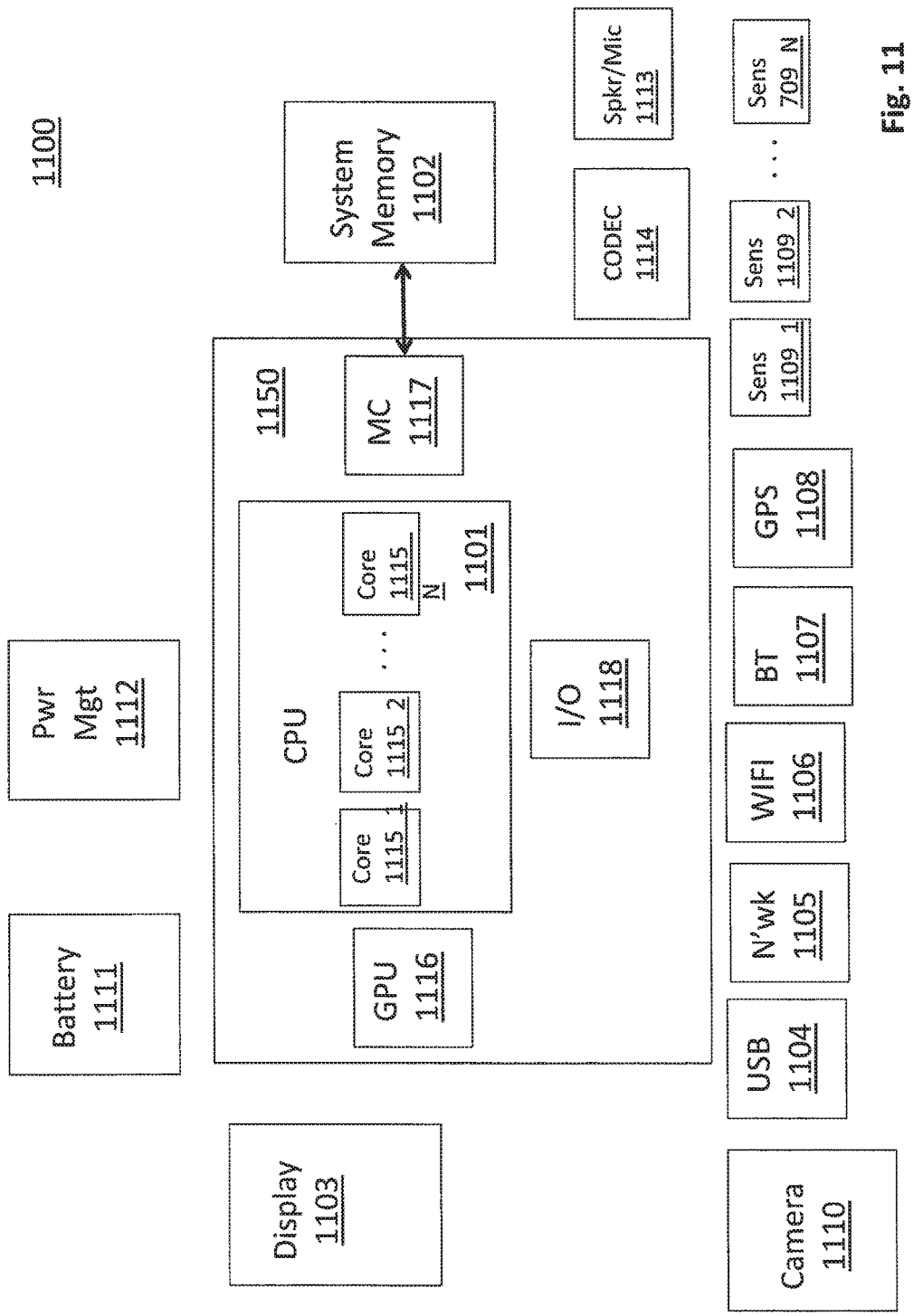

OPTICAL FLOW BASED AUTO FOCUS

FIELD OF INVENTION

The field of invention relates generally to digital camera technology; and, more specifically to optical flow based auto-focus techniques.

BACKGROUND

With the decreased implementation cost of integrating sophisticated processing intelligence into various electronic devices, designers are looking at new image processing paradigms that conceivably could be implemented with an integrated processor and camera. Specifically, new methodologies that possess some computational intensity but at the same time could conceivably be executed by a modestly powerful processor that, e.g., may be integrated with a camera, are particularly of interest.

SUMMARY

A method is described that includes identifying a set of features of an object, the features being tracked in an image captured by a camera. The method also includes creating a field of vectors for the reference points. The vectors indicate magnitude and direction of change in position of the reference points across more than one frame of the image. The method further includes identifying existence of out of plane movement of the object's features from same radial orientation of the vectors. The method further includes determining an amount of closer/farther movement of the object's features to/from the camera from change in distances between a plurality of the reference points. The method further includes adjusting a position of camera's lens in view of the amount of closer/farther movement of the object's features to keep the camera focused on the object.

An apparatus is disclosed that includes means for identifying a set of features of an object, the features being tracked in an image captured by a camera. The apparatus also includes means for creating a field of vectors for the reference points. The vectors indicate magnitude and direction of change in position of the reference points across more than one frame of the image. The apparatus also include means for identifying existence of out of plane movement of the object's features from same radial orientation of the vectors. The apparatus also includes means for determining an amount of closer/farther movement of the object's features to/from the camera from change in distances between a plurality of the reference points. The apparatus also includes means for adjusting a position of a camera's lens in view of the amount of closer/farther movement of the object's features to keep the camera focused on the object.

FIGURES

The following description and accompanying drawings are used to illustrate embodiments of the invention. In the drawings:

FIG. 1 shows an object in an image frame;

FIGS. 2a, 2b and 2c depict an object that is moving closer to a camera;

FIGS. 3a and 3b show vector fields from the movement depicted in FIGS. 2a through 2c;

FIG. 10b shows an apparatus that the method of FIG. 10a can be executed on;

FIG. 11 shows an embodiment of a computing system.

DETAILED DESCRIPTION

Optical flow is an imaging process that recognizes movement of a recognized object within an image against a background. Because the object can be contrasted against the image's background, the movement of the object can be followed or tracked. Traditionally, however, optical flow processes have been devoted to understanding depth from the detected motion. That is, for instance, the tracking of an object by way of optical flow methods has been used to reconstruct a three dimensional (3D) scene from the object's motion.

Because optical flow processing methods have largely been applied to the understanding of depth from the tracked motion of an object, optical flow methods have not heretofore been known to be applied to auto-focusing. Auto-focusing, as is known in the art, involves the movement of a camera lens to keep an object in focus because the distance between the object and the camera has changed.

Accordingly, the instant application is directed to using optical flow techniques to track the motion of an object that is moving closer to or farther from a camera lens. By tracking such "out-of-plane" motion the change in distance between the object and a camera lens can be determined with some precision and, in turn, an adjustment to the camera lens position can be made to keep the object in focus.

FIG. 1 shows a depiction of a person's face 101 against a background 102. Here, the person's face 101 corresponds to the object that is being tracked. Object recognition processes are generally known in the art and any suitable object recognition process may be used to recognize the person's face 101 against the background 102. The area of the background 102 may generally correspond to the size of a frame of an overall image being captured by a camera. With the object 101 being recognized, or merely with certain features (e.g., eyes, nose, mouth, etc.) being recognized (even if a larger object, such as the person's face, is not recognized), reference points for the object/features may likewise be readily identified. Here, FIG. 1 shows a plurality of reference points A-O that have been identified both at the perimeter of the object A-H (that circumnavigate the outline of the person's head) and within the object I-O (e.g., eyes, nose, corners of mouth, etc.). Here, again, it is possible that the reference points A-O are identifiable from mere recognition of the specific features of any person's face (eyes, nose, corners of mouth, etc.) without recognition of a particular person's face as a whole (i.e., without recognition of a particular object as a whole).

Figure 2A:
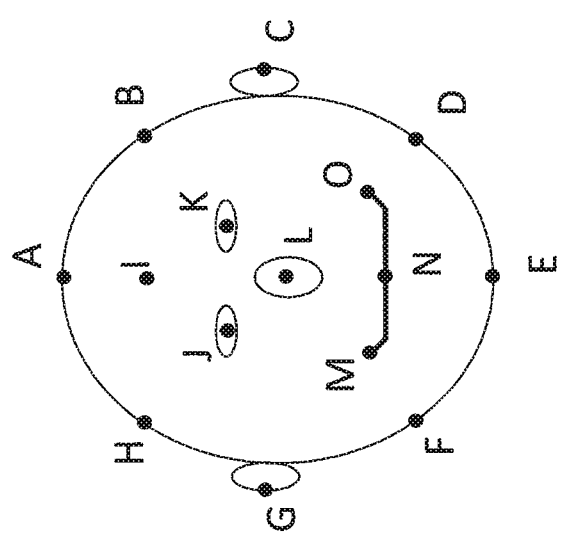
Figure 2C:
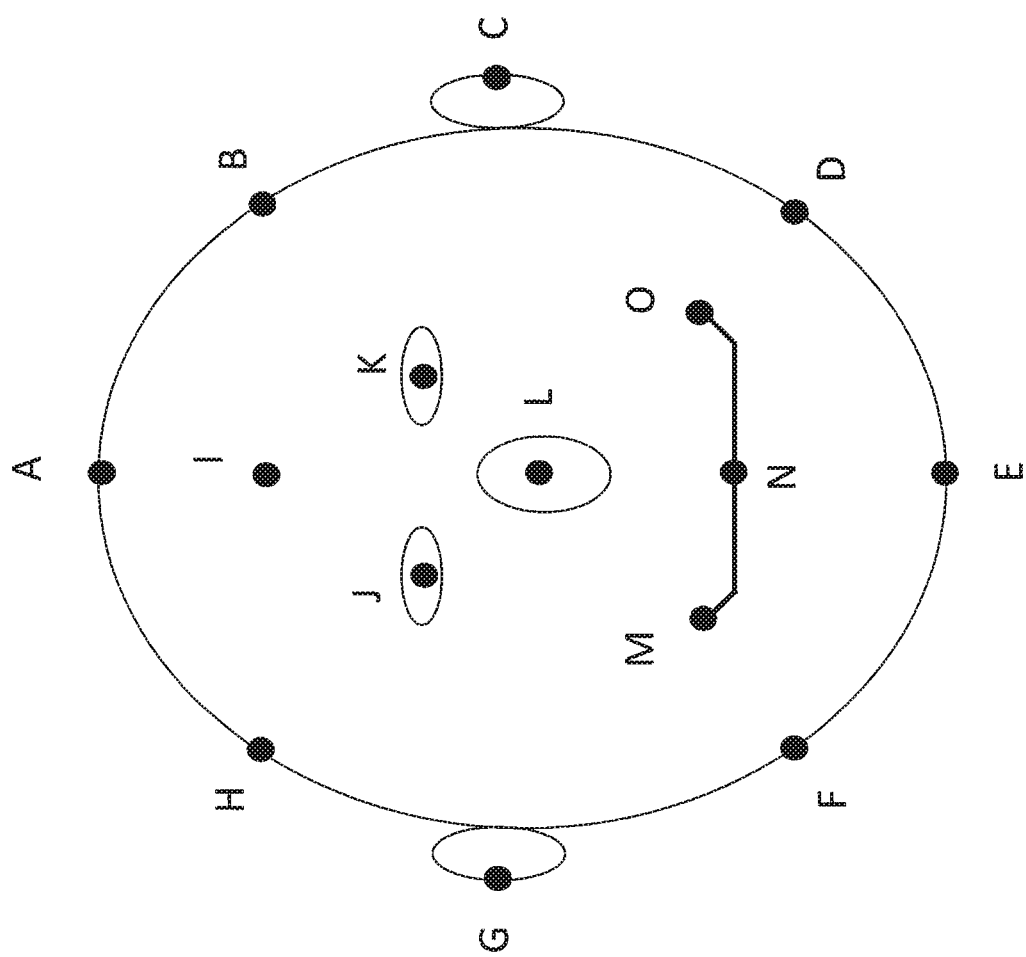

FIGS. 2a through 2c show a sequence of change in the relative positions of the reference points A-O as the person's face moves closer to the camera. For example, each of FIGS. 2a through 2c may correspond to a different image frame captured by a camera at different moments in time. The frames may be immediately consecutive or there may be intervening frames between them.

FIG. 2a corresponds to an initial position of the face that is farthest away from the camera lens. FIG. 2b shows the face after it has moved closer to the camera lens. FIG. 2c shows the face after it has moved even closer to the camera lens from its position in FIG. 2b. In general, the relative positions of the reference points A-O can be characterized as an "explosion" as they move out radially from a center axis of the face (which approximately runs through reference point L).

Figure 3A:
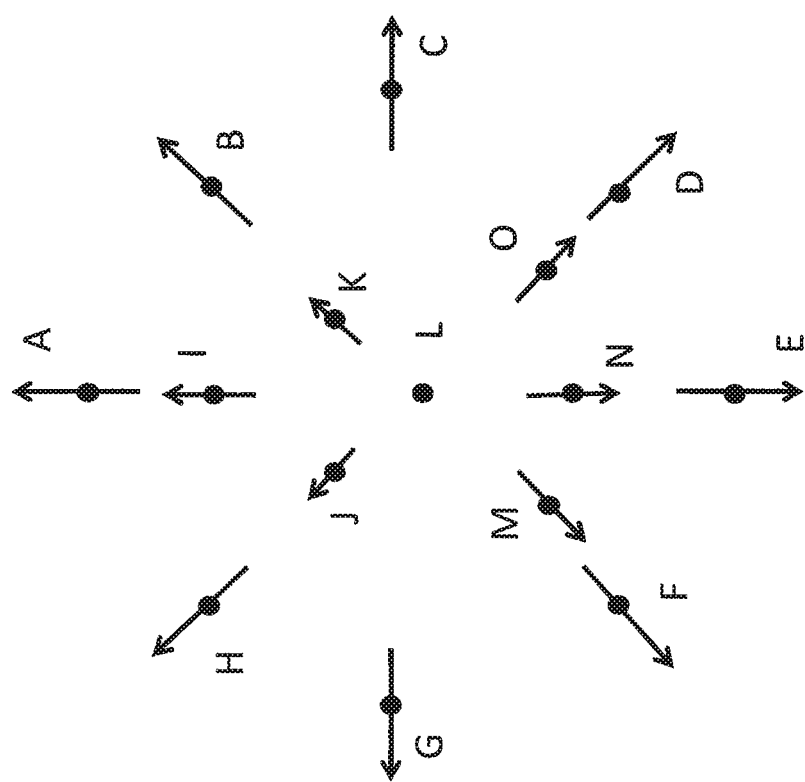

FIGS. 3a and 3b show vector fields for the reference points from the sequence of FIGS. 2a through 2c. A vector, as is understood in the art, demonstrates both magnitude and direction. The vector field of FIG. 3a shows the magnitude and direction of the change in position of each corresponding reference point as the face moved from the position in FIG. 2a to the position in FIG. 2b. Likewise, the vector field of FIG. 3b shows the magnitude and direction of the change in position of each corresponding reference point as the face moved from the position in FIG. 2b to the position in FIG. 2c.

Said another way, FIG. 3a shows the divergence of the reference points as the object has moved from its position in FIG. 2a to its position in FIG. 2b. Likewise, FIG. 3b shows the divergence of the reference points as the object has moved from its position in FIG. 2b to its position in FIG. 2c. The divergence when the vectors are pointing radially outward as a consequence of movement of the object toward the lens can be characterized as positive divergence.

As can be gleaned from the vector diagrams of FIGS. 3a and 3b, motion closer to the camera can be identified when reference points of the object explode outward as exemplified by radial movement away from the center of the object. That is, the vectors of the reference points generally point outward radially. Consistent with the explosion analogy, reference points A-H at the periphery of the object (around the perimeter of the person's head) exhibit greater radial motion than reference points I-O within the object.

That is, the magnitudes of the vectors for the reference points A-H at the perimeter of the person's head are larger than the magnitudes of the vectors for the reference points I-O within the perimeter of the person's head. In general the magnitudes of the vectors become larger moving out from the center axis of the object. As such, the vectors exhibiting the largest positive divergence essentially identify the periphery of an object that is moving closer to the camera.

Figure 4A:
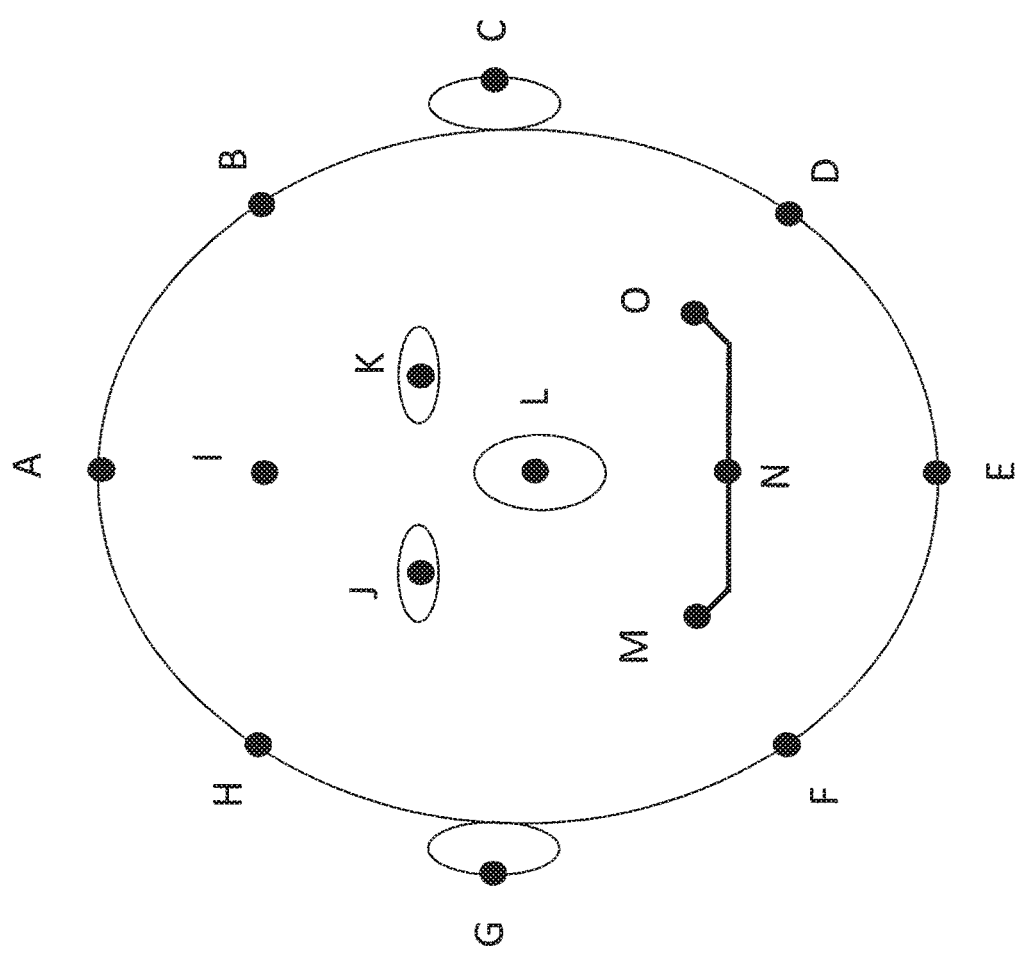
FIGS. 4a, 4b and 4c depict an object that is moving farther away from a camera.
Figure 4B:
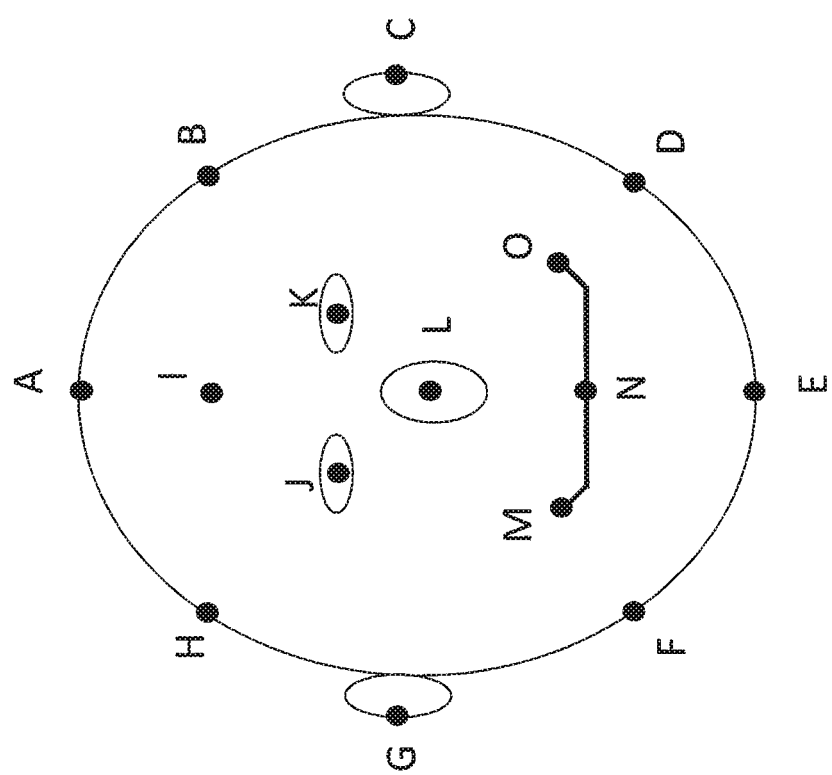
Figure 4C:
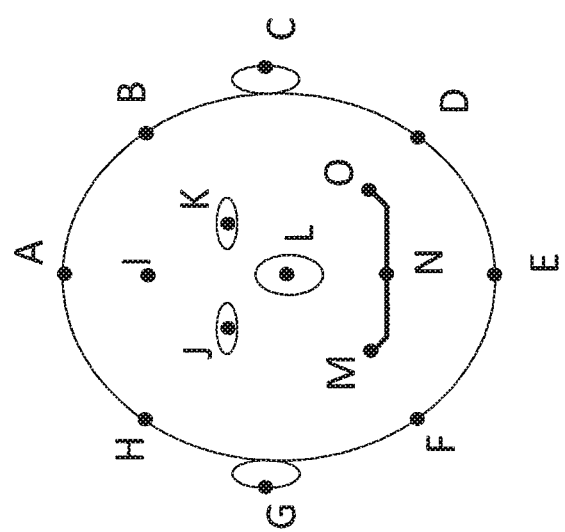

By contrast, FIGS. 4a through 4c show a sequence of change in the relative positions of the reference points as the person's face moves farther away from the camera. FIG. 4a corresponds to the initial position of the face as depicted in FIG. 2c. FIG. 4b shows the face after it has moved farther away from the camera lens. FIG. 4c shows the face after it has moved even farther away from the camera lens from its position in FIG. 4b. In general, the relative positions of the reference points can be characterized as an "implosion" as they move radially inward toward the center axis of the person's face.

Figure 5A:
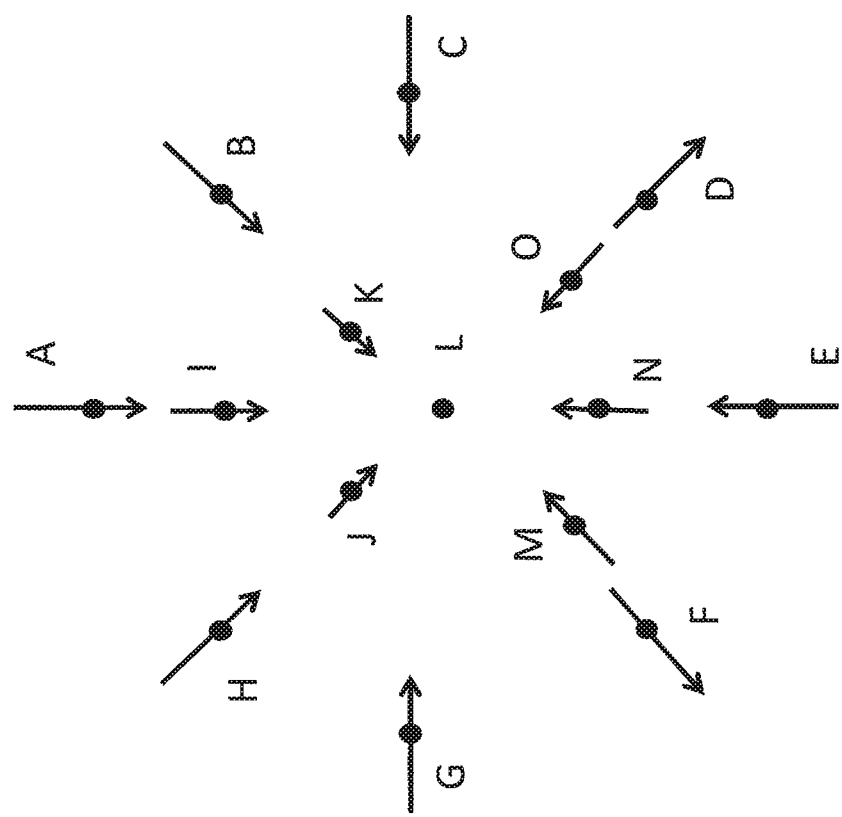
FIGS. 5a and 5b show vector fields from the movement depicted in FIGS. 4a through 4c.
Figure 5B:
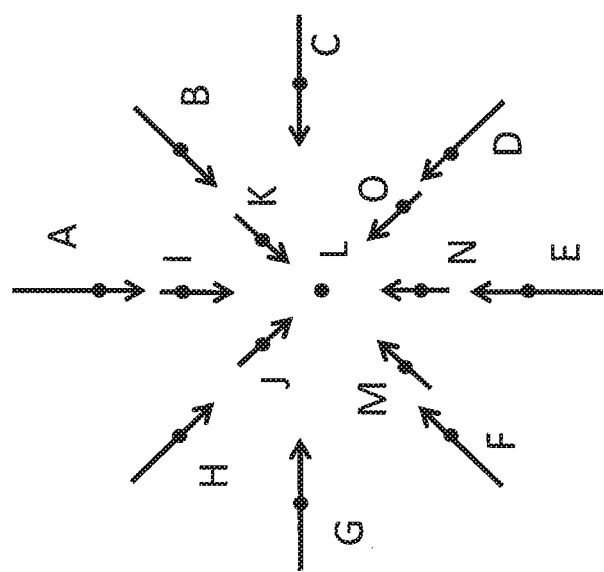

FIGS. 5a and 5b show vector fields for the reference points A-O from the sequence of FIGS. 4a through 4c. The vector field of FIG. 5a shows the magnitude and direction of the change in position of each corresponding reference point A-O as the face moved from the position in FIG. 4a to the position in FIG. 4b. Likewise, the vector field of FIG. 5b shows the magnitude and direction of the change in position of each corresponding reference point A-O as the face moved from the position in FIG. 4b to the position in FIG. 4c.

Thus, FIG. 5a shows the divergence of the reference points as the object has moved from its position in FIG. 4a to its position in FIG. 4b. Likewise, FIG. 5b shows the divergence of the reference points as the object has moved from its position in FIG. 4b to its position in FIG. 4c. The divergence when the vectors are pointing inward as a consequence of movement of the object away from the camera lens can be characterized as negative divergence.

As can be gleaned from the vector diagrams of FIGS. 5a and 5b, motion farther away from the camera can be identified when reference points of the object implode inward as exemplified by radial movement into the center of the object. That is, the vectors of the reference points A-O generally point inward radially. Consistent with the implosion analogy, reference points at the periphery of the object A-H (around the perimeter of the person's head) exhibit a greater movement than reference points within the object.

That is, the magnitudes of the vectors for the reference points A-H at the perimeter of the person's head are larger than the magnitudes of the vectors for the reference points I-O within the perimeter of the person's head. Again, in general, the magnitudes of the vectors become larger moving out from the center axis of the object and the maximum divergence of the family of vectors (i.e., the vectors having the largest magnitudes) are found at the periphery of the object. As such, the vectors exhibiting the largest negative divergence essentially identify the periphery of an object that is moving farther away from the camera.

Figure 6:
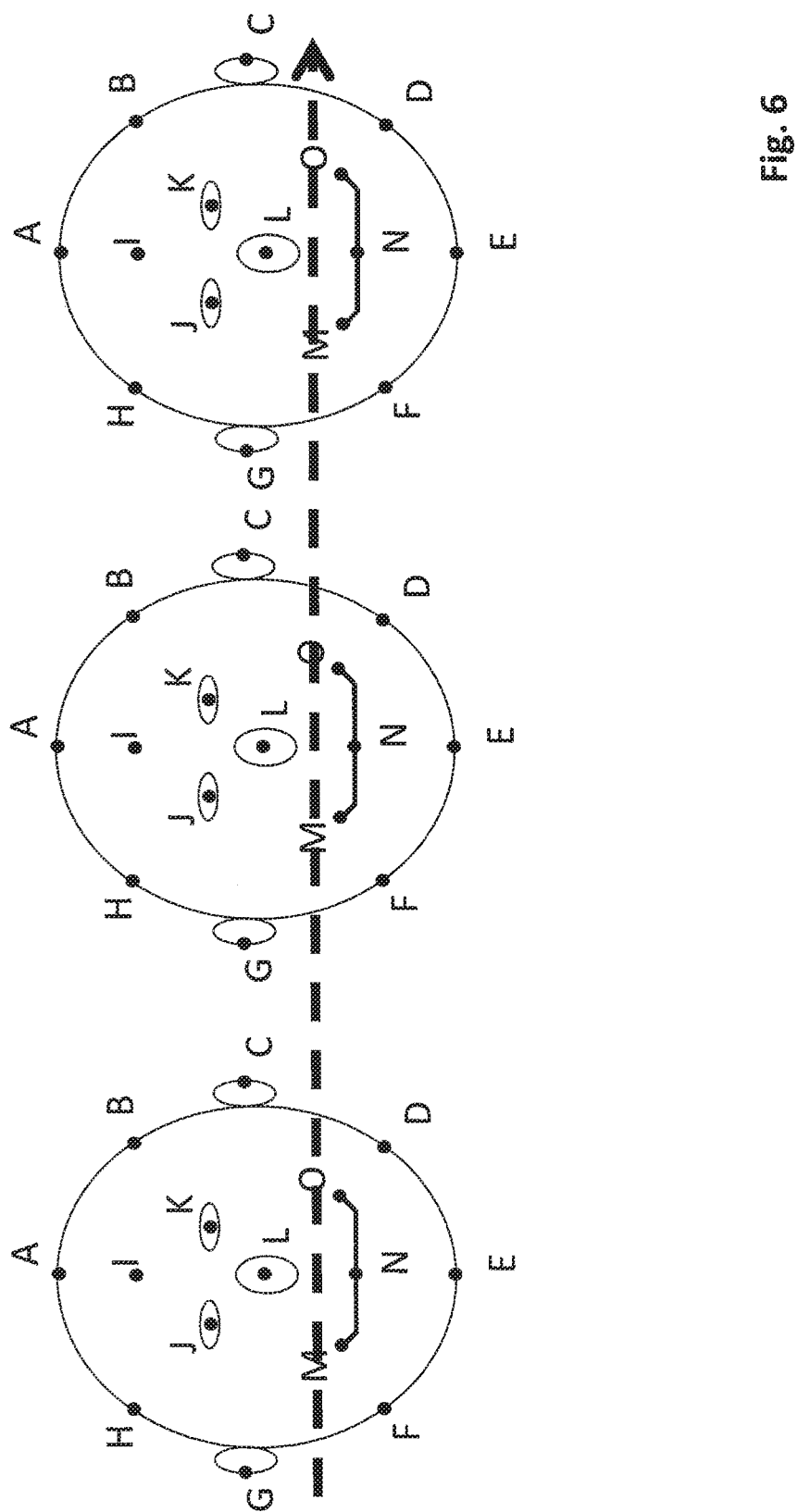
FIG. 6 shows lateral motion of an object.
Figure 7:
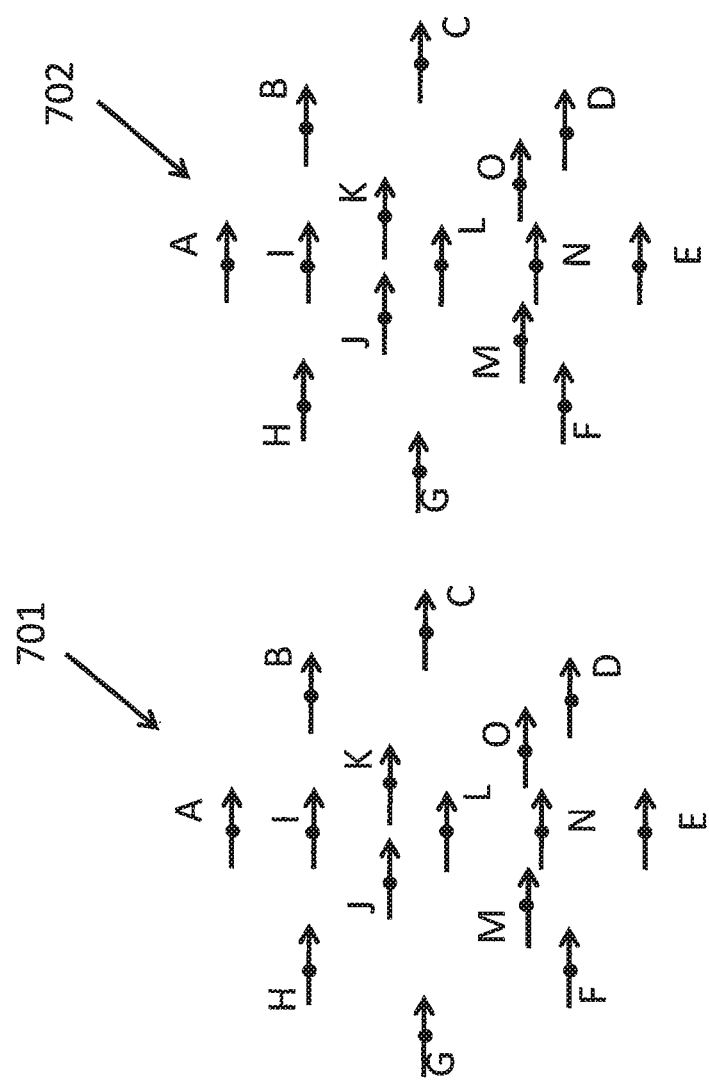
FIG. 7 shows vector fields from the movement of the object in FIG. 6.

As a point of contrast, FIGS. 6 and 7 pertain to in-plane motion of the object. Here, FIG. 6 shows the object in three different locations along a horizontal axis as it moves laterally from left to right across the image frame. FIG. 7 shows the corresponding vector vectors for the reference points. Vector field 701 shows the vector field for the object as it moves from the leftmost position to the center position and vector field 702 shows the vector field for the object as it moves from the center position to the rightmost position. Note that all vectors reflect a same amount of positional change in a same direction rather than exploding outward or imploding inward. Additionally, vectors at the leading edge of the object's motion (e.g., for reference points B, C, D) exhibit positive divergence while vectors at the trailing edge of the object's motion (e.g., for reference points H, G, F) exhibit negative divergence.

Thus, in plane motion of an object can be differentiated from out of plane motion of the object by calculating vectors for reference points over time that reflect the divergence in the reference points' respective positions over time and recognizing certain characteristics in the vectors as a whole. More specifically, if the family of vectors for an object substantially point in a same direction the object is moving in plane and an auto-focus function need not make any lens position adjustments (the object is not moving closer to or farther from the camera lens).

By contrast, if the family of vectors for an object substantially point outward radially the object is moving out of plane closer to the camera and an auto-focus function should adjust the camera lens to bring into focus an object that is closer to the camera. Alternatively, if the family of vectors for an object substantially point radially inward, the object is moving out of plane farther away from the camera and an auto-focus function should adjust the camera lens to bring into focus an object that is farther away from the camera.

After vector tracking of the movement of an object's reference points reveals that the object is moving out of plane, further processing should determine how far the object has moved out of plane so that a new lens position that keeps the object in focus can be determined. Recall from above that the family of vectors exhibiting maximum divergence generally outline the periphery of the object as it moves out of plane. In an embodiment, triangulation is employed with the reference points within the periphery of the object to determine how far the object has moved out of plane.

That is, in an embodiment, different reference points are used for different purposes. Specifically, reference points at the periphery of the object A-H are analyzed to flag whether the object is moving out of plane, and, if so, in which direction (closer to the camera or farther from the camera). If the object is deemed to be moving out of plane, reference points within the object I-O are used to determine how far the object has moved.

Thus, in an embodiment, periphery reference points A-H are analyzed to recognize in plane movement (e.g., if some of the periphery reference points exhibit positive divergence while other periphery reference points exhibit negative divergence). If in plane movement is recognized, the camera lens does not need to be repositioned. Likewise, periphery reference points A-H are also analyzed to not only recognize out-of-plane movement but also recognize the direction of the out-of-plane movement (e.g., if all such reference points exhibit positive divergence movement is toward the camera, whereas, if all such reference points exhibit negative divergence movement is away from the camera).

Figure 8:
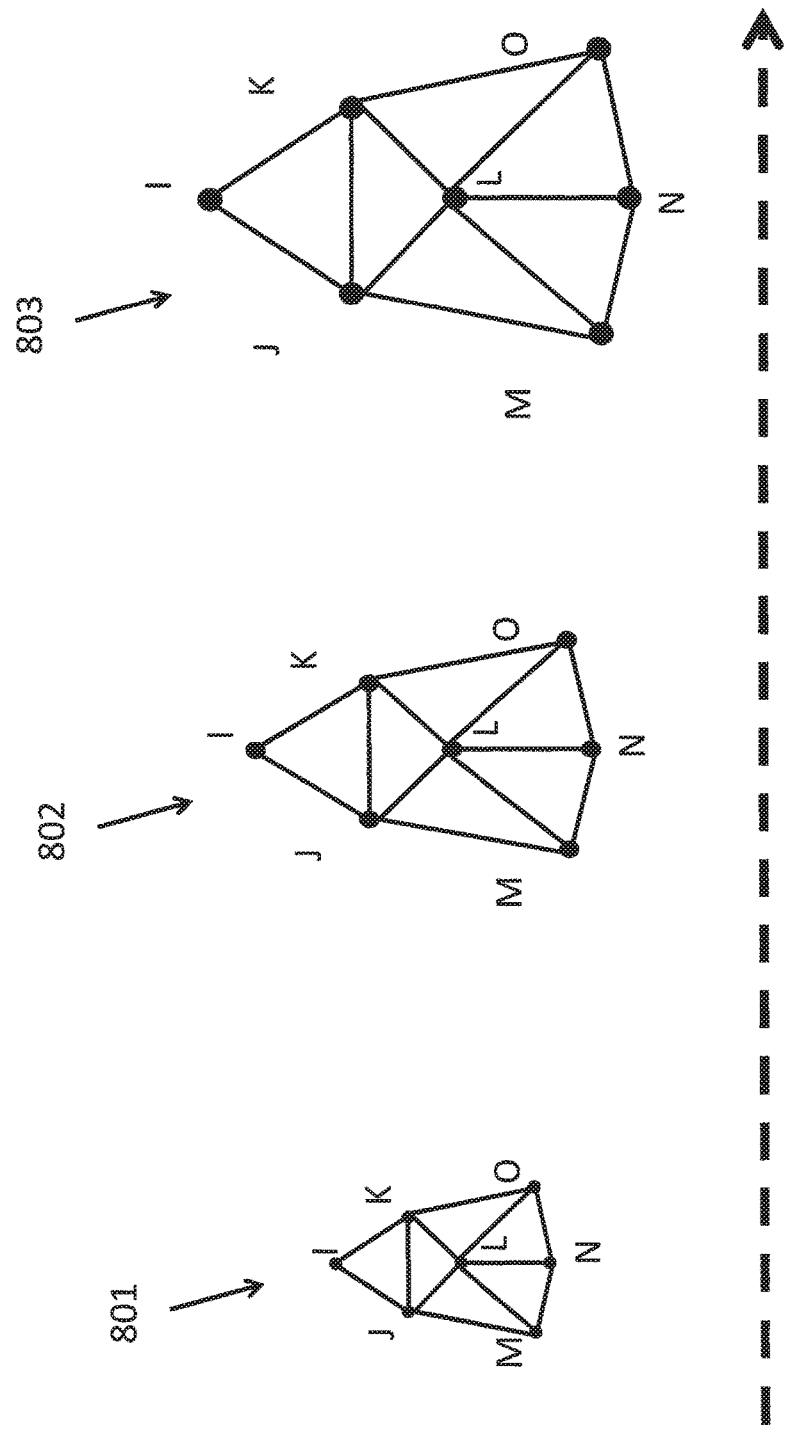
FIG. 8 shows triangulation of reference points for an object that is moving closer to a camera.
Figure 9:
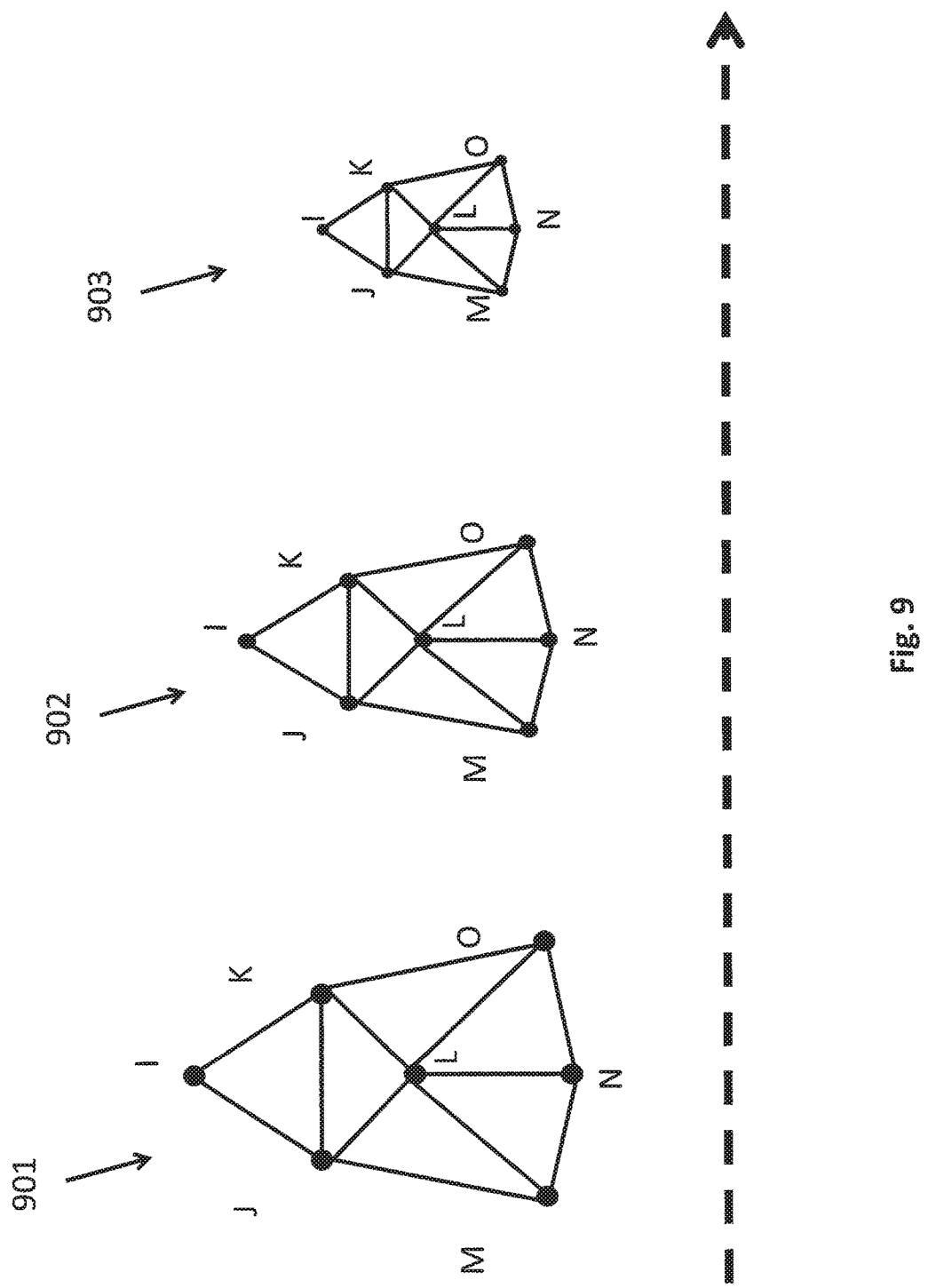
FIG. 9 shows triangulation of reference for an object that is moving farther away from a camera.

By contrast, as observed in FIGS. 8 and 9, the inner reference points I-O can be used to support a triangulation method of determining how far the object has moved toward or away from the camera. FIG. 8 shows triangulations for determining how far the object has moved toward the camera during the sequence of FIGS. 2a through 2c, whereas, FIG. 9 shows triangulations for determining how far the object has moved away from the camera during the sequence of FIGS. 4a through 4c.

Here, FIG. 8a shows a first triangulation 801 for reference points A-H as the object appears in FIG. 2a, a second triangulation 802 for reference points A-H as the object appears in FIG. 2b and a third triangulation 803 for reference points A-H as the object appears in FIG. 2c.

Referring to FIG. 8, different ones of reference points A-H are connected by non crossing lines to create a plurality of triangles having respective triangle legs. Specifically, twelve triangle legs are observed in each triangulations 801, 802, 803 of FIG. 8 (IJ, IK, JK, JL, KL, JM, KO, LM, LN, LO, MN, NO). As the object moves closer to the camera, each of the triangle legs grows in length. Thus, the length of the triangle legs can be correlated to the object's distance from the camera, where, larger triangle legs correspond to being closer to the camera and shorter triangle legs correspond to being farther away from the camera.

Here, some knowledge of the optical design of the camera (e.g., the magnification of the camera lens, the focal distance of the camera lens, etc.) may be needed to precisely correlate a change in triangle leg length to a distance that the object has moved to/from the camera. One of ordinary skill can, for instance, readily develop a mathematical expression that accepts, e.g., average percentage change in triangle leg length across all triangle legs as an input value and provides a distance the object has moved to/from the camera lens as an output value.

Thus, starting with an object that is known to be in focus, if the object moves closer to the camera the increased length in the triangle legs can be precisely determined and correlated to a precise distance that the object has moved in a direction toward the camera. This distance can then be used to determine a new position for a camera lens to keep the object in focus.

That is, an auto-focus routine can adjust, e.g., a position of a lens within the camera to effectively change the focal length of the camera such that the object remains in focus. Here, the aforementioned mathematical expression that provides object distance movement from triangle leg length change can be further developed to provide appropriate lens movement, from increased triangle leg length change, to reduce focal length distance.

Similarly, FIG. 9a shows a first triangulation 901 for reference points A-H as the object appears in FIG. 4a, a second triangulation 902 for reference points A-H as the object appears in FIG. 4b and a third triangulation 903 for reference points A-H as the object appears in FIG. 4c.

Here, starting with an object that is known to be in focus, if the object moves farther away from the camera the decreased length in the triangle legs can be precisely determined and correlated to a precise distance that the object has moved in a direction away from the camera. This distance can then be used to determine a new position for a camera lens to keep the object in focus.

If the triangulation calculations determine that the object has moved some distance along the center axis away from the camera, an auto-focus routine will comprehend that the position of the lens needs to be changed a certain amount in a certain direction to keep the object in focus. The auto-focus routine can then adjust, e.g., the position of a the lens within the camera accordingly. Here, the aforementioned mathematical expression that provides object distance movement from triangle leg length change can be further developed to provide appropriate lens movement, from reduced triangle leg length change, to an appropriate lens to image plane distance.

Figure 10A:
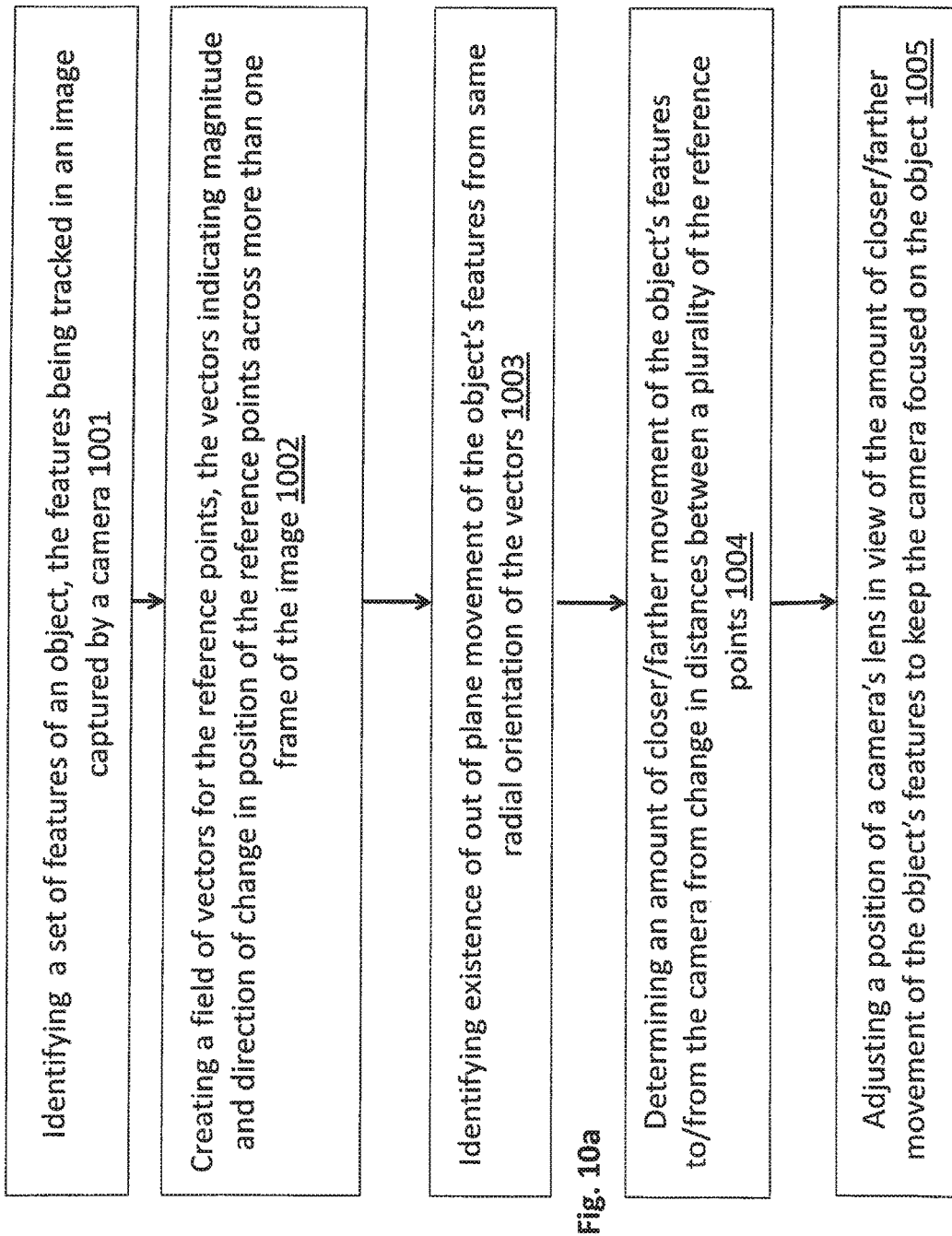
FIG. 10a shows an optical flow based auto focus method.

FIG. 10a shows an auto-focusing method for a camera as described above. The method includes identifying 1001 a set of features of an object, the features being tracked in an image captured by a camera. The method also includes creating 1002 a field of vectors for the reference points, the vectors indicating magnitude and direction of change in position of the reference points across more than one frame of the image. The method also includes identifying 1003 existence of out of plane movement of the object from same radial orientation of the vectors. The method also includes determining 1004 an amount of closer/farther movement of the object to/from the camera from change in distances between a plurality of the reference points. The method also includes adjusting 1005 a position of a camera's lens in view of the amount of closer/farther movement of the object to keep the camera focused on the object.

Any of the optical flow based auto-focusing methods described above may be performed, partially or wholly, by a "smart camera" that has processing intelligence integrated with the camera itself (e.g., integrated within a camera package along with lens, photo-detector, etc. or just outside the camera package). For example, a camera may include an integrated processor and memory where the memory stores program code instructions that are executed by the processor to perform any of the optical flow based auto-focusing methodologies described just above. Alternatively or in combination the auto-focusing methodologies may be implemented and/or enhanced with dedicated custom (e.g., logic) circuitry which may be hardwired and/or programmable. Such circuitry again may be integrated with the camera itself (e.g., within the camera package). In still yet other embodiments the optical flow based auto-methodologies, or any portion thereof, may be performed by a main CPU or applications processor that operates out of a main or system memory of a computing system.

Figure 10B:
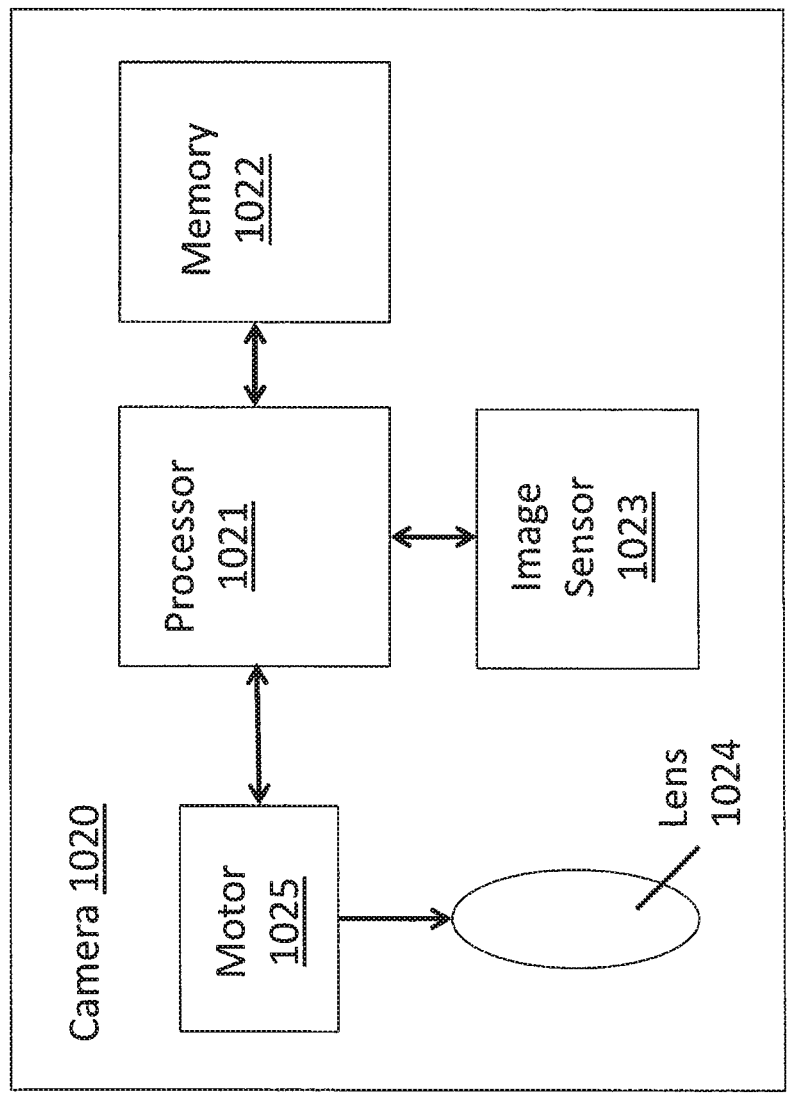

FIG. 10b shows an embodiment of a smart camera that can perform the method of FIG. 10a. As observed in FIG. 10b, the camera 1020 includes a processor 1021 and a memory 1022. The program code for an auto focus routine such as the routine of FIG. 10a is stored in memory 1022 and executed by the processor 1021. The processor 1021 is coupled to an image sensor 1023 which enables the processor to process content being observed by the camera 1020. The processor 1021 is also coupled to a motor 1025 that adjusts the focus. The focus can be adjusted using a motor that changes the position of a focus lens relative to the image sensor 1023, moves a mirror, or mirrors, positioned between a camera lens and the image sensor 1023, or the like. In execution of the method of FIG. 10a, for example, the processor 1021 processes images that are sensed by the image sensor 1023 and, in response thereto, provides input stimuli to the motor 1025 to change the focal length of the lens 1024 and image sensor 1023 in accordance with the auto-focus routine. Other camera embodiments may include more than one lens.

FIG. 11 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two.

As observed in FIG. 11, the basic computing system may include a central processing unit 1101 (which may include, e.g., a plurality of general purpose processing cores 1115_1 through 1115_N and a main memory controller 1117 disposed on a multi-core processor or applications processor), system memory 1102, a display 1103 (e.g., touchscreen, flat-panel), a local wired point-to-point link (e.g., USB) interface 1104, various network I/O functions 1105 (such as an Ethernet interface and/or cellular modem subsystem), a wireless local area network (e.g., WiFi) interface 1106, a wireless point-to-point link (e.g., Bluetooth) interface 1107 and a Global Positioning System interface 1108, various sensors 1109_1 through 1109_N, one or more cameras 1110, a battery 1111, a power management control unit 1112, a speaker and microphone 1113 and an audio coder/decoder 1114.

An applications processor or multi-core processor 1150 may include one or more general purpose processing cores 1115 within its CPU 1101, one or more graphical processing units 1116, a memory management function 1117 (e.g., a memory controller), an I/O control function (such as the aforementioned peripheral control hub) 1118. The general purpose processing cores 1115 typically execute the operating system and application software of the computing system. The graphics processing units 1116 typically execute graphics intensive functions to, e.g., generate graphics information that is presented on the display 1103. The memory control function 1117 interfaces with the system memory 1102 to write/read data to/from system memory 1102. The power management control unit 1112 generally controls the power consumption of the system 1100.

Each of the touchscreen display 1103, the communication interfaces 1104-1107, the GPS interface 1108, the sensors 1109, the camera 1110, and the speaker/microphone codec 1113, 1114 all can be viewed as various forms of I/O (input and/or output) relative to the overall computing system including, where appropriate, an integrated peripheral device as well (e.g., the one or more cameras 1110). Depending on implementation, various ones of these I/O components may be integrated on the applications processor/multi-core processor 1150 or may be located off the die or outside the package of the applications processor/multi-core processor 1150.

In an embodiment the camera 1110 uses optical flow based auto focusing techniques as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A non-transitory machine-readable storage medium containing program code that when processed by a processor causes a method to be performed, the method comprising:

receiving a first image that was captured by a camera at a first time, the first image showing an object in view of the camera at the first time;

analyzing the first image to determine, for each feature in a set of features of the object, a first image position for the feature at the first time;

receiving a second image that was captured by the camera at a second time that occurs after the first time, the second image showing the object in view of the camera at the second time;

analyzing the second image to determine, for each feature in the set of features of the object, a second image position for the feature at the second time;

determining, based on the first image positions for at least a first subset of the set of features of the object at the first time and the second image positions for the at least the subset of the set of features of the object at the second time, whether the object moved out of plane relative to the camera from the first time to the second time;

in response to determining that the object moved out of plane relative to the camera from the first time to the second time, determining an amount of out-of-plane movement of the object from the first time to the second time based on changes in (i) distances between pairs of features of the object in at least a second subset of the set of features of the object at the first time and (ii) distances between the pairs of features of the object at the second time; and adjusting a position of a lens of the camera based on the amount of out-of-plane movement of the object from the first time to the second time, so as to focus the camera on the object.

2. The machine-readable storage medium of claim 1, wherein determining whether the object moved out of plane relative to the camera from the first time to the second time comprises creating a field of vectors for the set of features of the object, wherein each vector in the field of vectors corresponds to a different feature of the set of features of the object and indicates a magnitude and a direction of change in image position of the corresponding feature of the object from the first time to the second time based on a difference between the first image position for the corresponding feature of the object at the first time and the second image position for the corresponding feature of the object at the second time.

3. The machine-readable storage medium of claim 2, wherein the method further comprises:

determining that vectors in the field of vectors have a same radial orientation; and determining, based on the vectors in the field of vectors having the same radial orientation, that the object moved out of plane relative to the camera from the first time to the second time.

4. The machine-readable storage medium of claim 3, wherein:

the vectors in the field of vectors have an outward radial orientation, and the method comprises determining, based on the vectors in the field of vectors having the outward radial orientation, that the object moved closer to the camera from the first time to the second time.

5. The machine-readable storage medium of claim 3, wherein:

the vectors in the field of vectors have an inward radial orientation, and the method comprises determining, based on the vectors in the field of vectors having the inward radial orientation, that the object moved farther from the camera from the first time to the second time.

6. The machine-readable storage medium of claim 2, wherein the method further comprises:

determining that vectors in the field of vectors indicate a substantially same direction of change in image positions of the corresponding features of the object from the first time to the second time; and determining, based on the vectors in the field of vectors indicating the substantially same direction of change in image positions of the corresponding features of the object from the first time to the second time that the object did not move out of plane relative to the camera from the first time to the second time.

7. The machine-readable storage medium of claim 1, wherein the camera captured the first image at the first time when the object was identified as being in focus, wherein the camera captured the first image at the second time when the object was not in focus.

8. The machine-readable storage medium of claim 1, wherein the method further comprises:

selecting, from the set of features of the object, a subset of peripheral features of the object;

selecting, from the set of features of the object, a subset of interior features of the object;

determining whether the object moved out of plane relative to the camera from the first time to the second time based on image positions for the subset of peripheral features of the object; and determining the amount of out-of-plane movement of the object from the first time to the second time based on image positions for the subset of interior features of the object.

9. The machine-readable storage medium of claim 1, wherein the method further comprises determining the pairs of features of the object by:

(i) connecting features in the at least the second subset of the set of features of the object with non-crossing lines so as to form triangles among the at least the second subset of the set of features of the object, and (ii) selecting the connected features as the pairs of features of the object from which the amount of out-of-plane movement of the object from the first time to the second time is determined.

10. The machine-readable storage medium of claim 1, wherein determining the amount of out-of-plane movement of the object from the first time to the second time comprises:

determining, for each of the pairs of features of the object, a first distance between the first image positions for the pair of features of the object at the first time;

determining, for each of the pairs of features of the object, a second distance between the second image positions for the pair of features of the object at the second time;

determining, for each of the pairs of features of the object and based on the first distance between the first image positions for the pair of features of the object at the first time and the second distance between the second image positions for the pair of features of the object at the second time, a percentage change in distance for the pair of features from the first time to the second time;

determining an average percentage change in distance for the pairs of features of the object from the first time to the second time; and determining the amount of out-of-plane movement of the object from the first time to the second time from the average percentage change in distance for the pairs of features of the object.

11. A method performed by a processor, comprising:

receiving a first image that was captured by a camera at a first time, the first image showing an object in view of the camera at the first time;

analyzing the first image to determine, for each feature in a set of features of the object, a first image position for the feature at the first time;

receiving a second image that was captured by the camera at a second time that occurs after the first time, the second image showing the object in view of the camera at the second time;

analyzing the second image to determine, for each feature in the set of features of the object, a second image position for the feature at the second time;

determining, based on the first image positions for at least a first subset of the set of features of the object at the first time and the second image positions for the at least the subset of the set of features of the object at the second time, whether the object moved out of plane relative to the camera from the first time to the second time;

in response to determining that the object moved out of plane relative to the camera from the first time to the second time, determining an amount of out-of-plane movement of the object from the first time to the second time based on changes in (i) distances between pairs of features of the object in at least a second subset of the set of features of the object at the first time and (ii) distances between the pairs of features of the object at the second time; and adjusting a position of a lens of the camera based on the amount of out-of-plane movement of the object from the first time to the second time, so as to focus the camera on the object.

12. The method of claim 11, wherein determining whether the object moved out of plane relative to the camera from the first time to the second time comprises creating a field of vectors for the set of features of the object, wherein each vector in the field of vectors corresponds to a different feature of the set of features of the object and indicates a magnitude and a direction of change in image position of the corresponding feature of the object from the first time to the second time based on a difference between the first image position for the corresponding feature of the object at the first time and the second image position for the corresponding feature of the object at the second time.

13. The method of claim 12, further comprising:
determining that vectors in the field of vectors have a same radial orientation; and
determining, based on the vectors in the field of vectors having the same radial orientation, that the object moved out of plane relative to the camera from the first time to the second time.

14. The method of claim 13, wherein:
the vectors in the field of vectors have an outward radial orientation, and
the method comprises determining, based on the vectors in the field of vectors having the outward radial orientation, that the object moved closer to the camera from the first time to the second time.

15. The method of claim 13, wherein:
the vectors in the field of vectors have an inward radial orientation, and
the method comprises determining, based on the vectors in the field of vectors having the inward radial orientation, that the object moved farther from the camera from the first time to the second time.

16. The method of claim 12, further comprising:
determining that vectors in the field of vectors indicate a substantially same direction of change in image positions of the corresponding features of the object from the first time to the second time; and
determining, based on the vectors in the field of vectors indicating the substantially same direction of change in image positions of the corresponding features of the object from the first time to the second time that the object did not move out of plane relative to the camera from the first time to the second time.

17. The method of claim 11, wherein the camera captured the first image at the first time when the object was identified as being in focus, wherein the camera captured the first image at the second time when the object was not in focus.

18. The method of claim 11, further comprising:
selecting, from the set of features of the object, a subset of peripheral features of the object;
selecting, from the set of features of the object, a subset of interior features of the object;
determining whether the object moved out of plane relative to the camera from the first time to the second time based on image positions for the subset of peripheral features of the object; and
determining the amount of out-of-plane movement of the object from the first time to the second time based on image positions for the subset of interior features of the object.

19. A camera, comprising:
an image sensor;
a lens assembly including at least one lens associated with the image sensor;
a motor coupled to the lens assembly;
a processor coupled to the motor; and
a memory coupled to the processor, the memory storing program code instructions that, when executed by the processor, cause a method to be performed, the method comprising:
receiving a first image that was captured by the camera at a first time, the first image showing an object in view of the camera at the first time;
analyzing the first image to determine, for each feature in a set of features of the object, a first image position for the feature at the first time;
receiving a second image that was captured by the camera at a second time that occurs after the first time, the second image showing the object in view of the camera at the second time;
analyzing the second image to determine, for each feature in the set of features of the object, a second image position for the feature at the second time;
determining, based on the first image positions for at least a first subset of the set of features of the object at the first time and the second image positions for the at least the subset of the set of features of the object at the second time, whether the object moved out of plane relative to the camera from the first time to the second time;
in response to determining that the object moved out of plane relative to the camera from the first time to the second time, determining an amount of out-of-plane movement of the object from the first time to the second time based on changes in (i) distances between pairs of features of the object in at least a second subset of the set of features of the object at the first time and (ii) distances between the pairs of features of the object at the second time; and
using the motor to adjust a position of the at least one lens of the lens assembly based on the amount of out-of-plane movement of the object from the first time to the second time, so as to focus the camera on the object.

20. The camera of claim 19, wherein the lens assembly includes a focus lens, and the motor is configured to move the focus lens to adjust the focus of the camera.

* * * * *